US 6,507,902 B1

(12) United States Patent
Hodges et al.

(10) Patent No.: US 6,507,902 B1
(45) Date of Patent: *Jan. 14, 2003

(54) DYNAMIC RAM DISK

(75) Inventors: Mark E. Hodges, Boise, ID (US); Harold C. Ockerse, Boise, ID (US); Gregory A. Vaughn, Meridian, ID (US)

(73) Assignee: Hewlett-Packard Company, Palo Alto, CA (US)

(*) Notice: Subject to any disclaimer, the term of this patent is extended or adjusted under 35 U.S.C. 154(b) by 158 days.

This patent is subject to a terminal disclaimer.

(21) Appl. No.: 09/686,532

(22) Filed: Oct. 10, 2000

Related U.S. Application Data

(63) Continuation of application No. 09/031,504, filed on Feb. 26, 1998, now Pat. No. 6,223,267.

(51) Int. Cl.[7] ............................................. G06F 13/14
(52) U.S. Cl. ........................ 711/171; 707/205; 707/206; 711/172; 711/173
(58) Field of Search ............................. 711/4, 104, 105, 711/171, 172, 173; 707/205, 206

(56) References Cited

U.S. PATENT DOCUMENTS

| 4,984,149 A | * | 1/1991 | Iwashita et al. ................ 711/4 |
| 5,359,713 A | * | 10/1994 | Moran et al. ................ 706/925 |
| 5,430,858 A | * | 7/1995 | Greeley et al. ................ 711/1 |
| 5,493,574 A | * | 2/1996 | McKinley ..................... 714/764 |
| 5,548,740 A | * | 8/1996 | Kiyohara ..................... 345/502 |
| 5,594,903 A | * | 1/1997 | Bunnell et al. ............. 709/328 |
| 5,606,681 A | * | 2/1997 | Smith et al. .................... 710/5 |

* cited by examiner

Primary Examiner—Than Nguyen

(57) ABSTRACT

A system and method dynamically allocate memory to a RAM disk. Upon a file transfer to the RAM disk, a device driver determines an amount of memory required by the RAM disk then requests the required amount of memory from a memory manager. As files are deleted from the RAM disk, the memory is released from the RAM disk by informing the memory manager of the addresses of the memory to be released. Sector freelists tracks each cluster of memory allocated to the RAM disk. When a sector becomes inactive, a corresponding bit in a sector freelist indicates the inactive status of the sector. When all of the sectors in a cluster are inactive, the cluster is released for the RAM disk.

8 Claims, 3 Drawing Sheets

DYNAMIC RAM DISK

CROSS REFERENCE TO RELATED APPLICATION(S)

This is a continuation of application Ser. No. 09/031,504 filed on Feb. 26, 1998 U.S. Pat. No. 6,223,267.

FIELD OF THE INVENTION

This invention relates in general to memory storage devices and, more particularly, to simulating a physical storage device using random access memory.

BACKGROUND OF THE INVENTION

Static (conventional) RAM disks have been in use in computing devices for some time. A RAM disk is random access memory (RAM) that has been configured to simulate a disk drive. Files are accessed on a RAM disk just as they are on a physical disk. RAM disks are also known as RAM drives, virtual disks, and virtual drives.

Static RAM disks must be configured at system startup. After startup, the configuration of the static RAM disk cannot be changed. Once RAM has been allocated to a static RAM disk, it cannot be used by the system for processing. The memory allocated to the static RAM disk may only be used by the static RAM disk.

Additionally, static RAM disks require the user to configure the amount of memory that will be set aside for data storage. In many environments this makes the static RAM disk difficult to use, and requires frequent reconfiguration depending on changing patterns of system use.

SUMMARY OF THE INVENTION

According to principles of the present invention in a preferred embodiment, a system and method dynamically allocate memory to a RAM disk. Upon a file transfer to the RAM disk, a device driver determines an amount of memory required by the RAM disk, then requests the required amount of memory from a memory manager. As files are deleted from the RAM disk, the memory is released from the RAM disk by informing the memory manager of the addresses of the memory to be released.

According to further principles of the present invention in a preferred embodiment, data is written to the RAM disk in fixed increments called sectors. Sectors are grouped together to form clusters. The number of sectors in a cluster is dependent on the memory manager. A freelist is a bit map used to monitor the status of each sector of a cluster. When a sector becomes inactive, a corresponding bit in a sector freelist indicates the inactive status of the sector. When all of the sectors in a cluster are inactive, the cluster is released from the RAM disk.

Other objects, advantages, and capabilities of the present invention will become more apparent as the description proceeds.

DETAILED DESCRIPTION OF THE INVENTION

Figure 1:
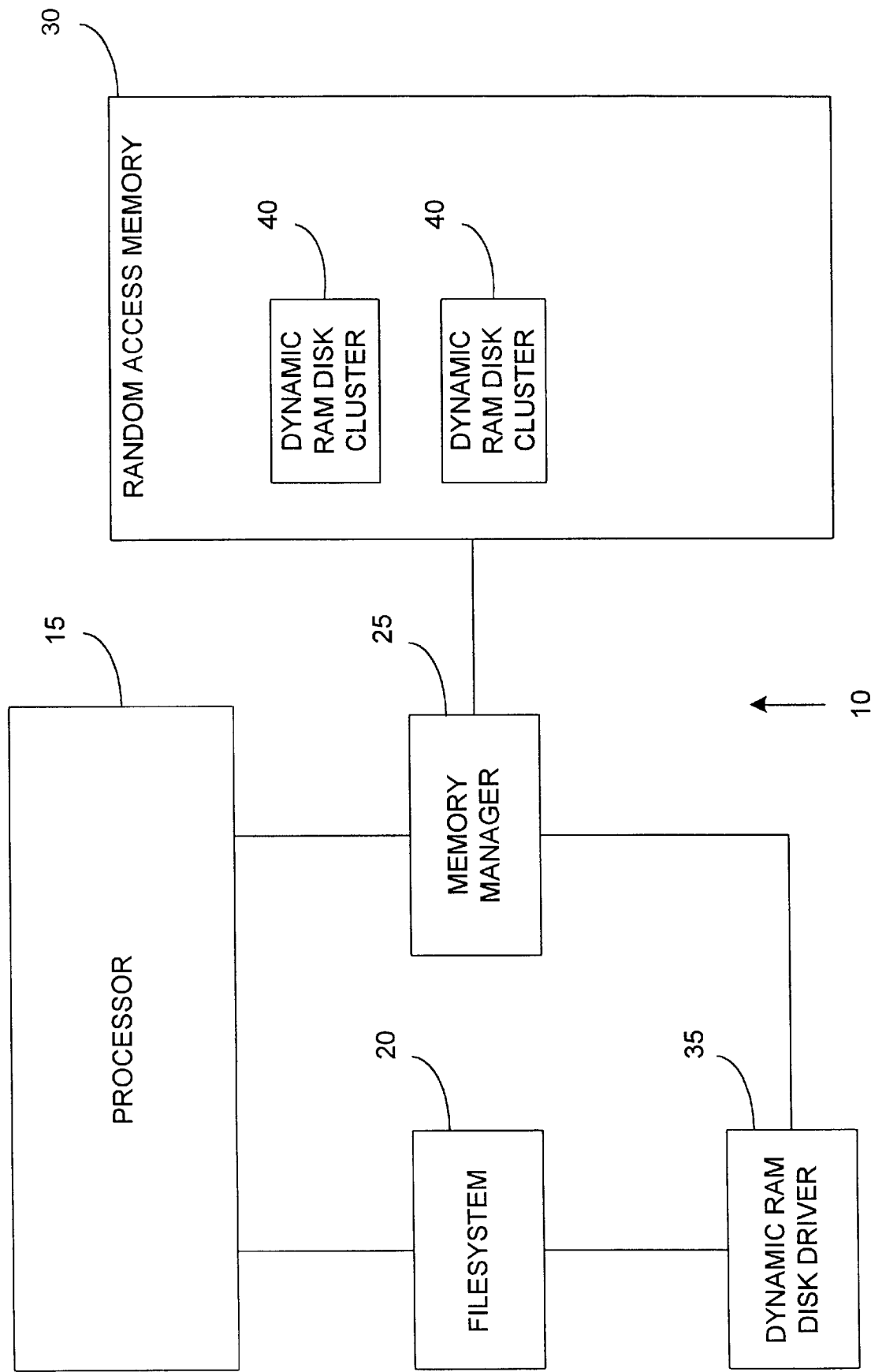
FIG. 1 is a block diagram of a memory management system.

FIG. 1 shows a memory management system 10 used in the present invention. A processor 15 communicates with a filesystem 20 and a memory manager 25. Memory manager 25 allocates random access memory (RAM) 30 between processor 15 and filesystem 20. Dynamic RAM disk device driver 35 communicates with filesystem 20 and memory manager 25 to construct and maintain dynamic RAM disk 40. Dynamic RAM disk 40 is formed from clusters of RAM 30. Dynamic RAM clusters 40 need not be contiguous in RAM 30.

Dynamic RAM disk 40 operates by allocating system memory 30 to accommodate the storage of data by filesystem 20. Subsequent calls from filesystem 20 to read or write data result in information being copied between filesystem 20 buffers and dynamic RAM disk 40 memory space. The address in dynamic RAM disk 40 memory space is computed based on a cluster and sector offset scheme.

Filesystem 20 operates on logical blocks. Dynamic RAM disk 40 maps logical blocks to physical clusters and sectors by dividing the logical block value by the number of sectors per cluster. In a typical application, the number of sectors per cluster is 16. The integer value of the quotient is the number of the physical cluster and the remainder is the number of the physical sector.

Dynamic RAM disk 40 allocates memory 30 as needed to store data, leaving more memory available to other subsystems for use. As files are deleted from filesystem 20, dynamic RAM disk 40 is informed of sectors that are discarded. When all of the sectors in a cluster have been discarded, the cluster is released and memory 30 is returned to the system.

Sectors are marked as active or inactive using a sector freelist. The sector freelist is an array of bits, where each bit corresponds to a sector in the associated cluster. If a bit in the freelist is set, the corresponding sector is active. When all bits in the freelist are clear, the associated cluster may be safely deallocated and returned to the system for other uses. Where supported by memory manager 25, each cluster may be relocated to reduce fragmentation problems in systems where there is a high frequency of file creation and deletion.

Filesystem 20 expects to operate on a device having a fixed capacity. In order to provide filesystem 20 with a fixed value, dynamic RAM disk 40 always reports a capacity to filesystem 20 that it is as large as memory 30 and the system configuration will allow. Should allocation of a new cluster fail when reported capacity is greater than actual capacity, Dynamic RAM disk 40 indicates a disk-full condition to filesystem 20. In some environments, this disk-full condition requires special handling by filesystem 20.

Figure 2:
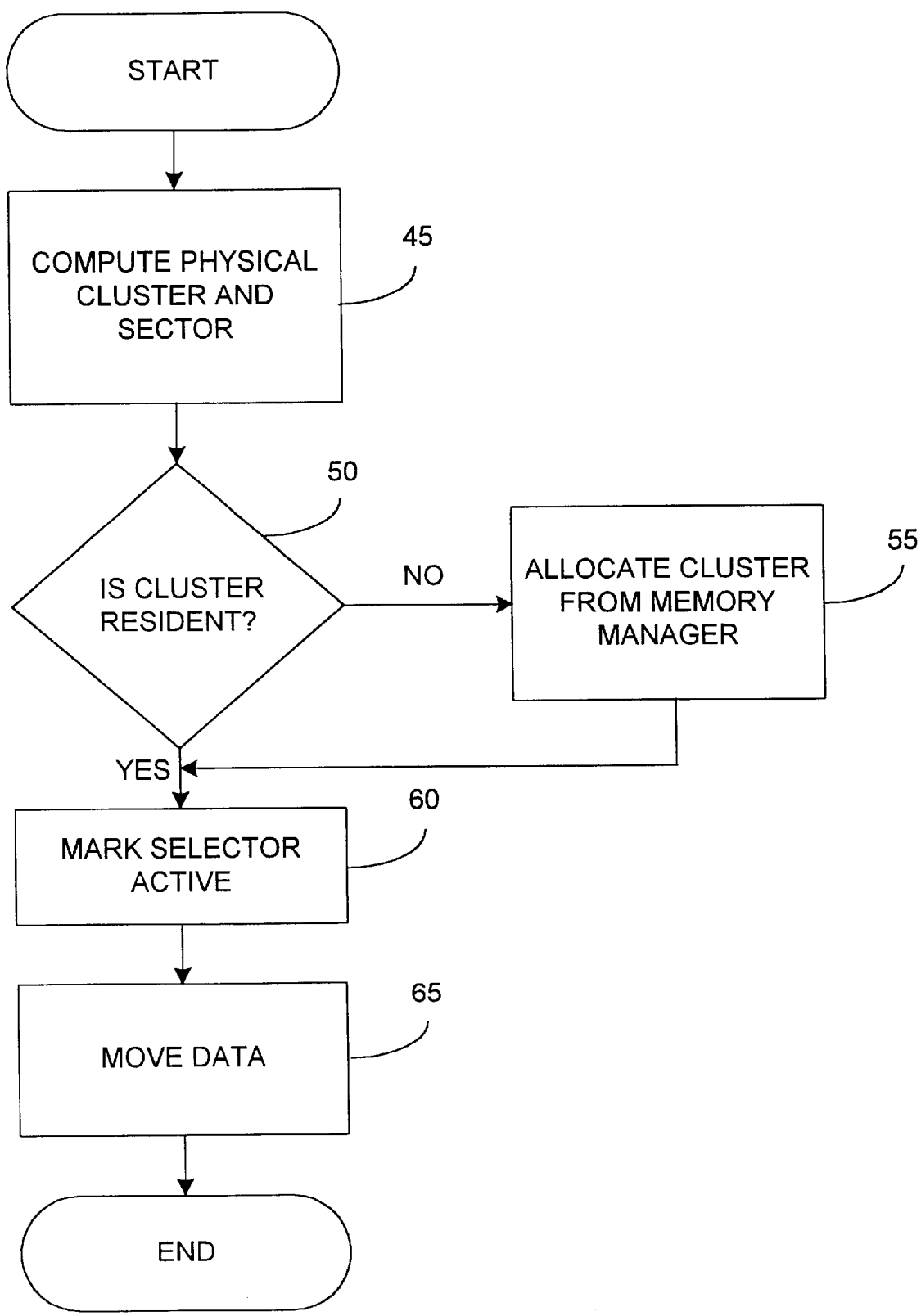
FIG. 2 is a flow chart showing a preferred embodiment of the present invention for dynamically allocating memory to a RAM disk.

Processor 15 performs a write or read operation using filesystem 20. Filesystem 20 carries out the operation by requesting a read or write of dynamic RAM disk device driver 35. FIG. 2 shows the operation of device driver 35 for a write or read operation. For each logical sector to be written, a physical cluster and sector are computed 45. A check is then made to determine 50 whether the computed cluster is already resident in RAM disk 40. If not, a new cluster is allocated 55 from system memory 30. Device driver 35 makes a request to memory manager 25 for a new cluster. Memory manager 25 then provides device driver 35 with the address of the new cluster to be added to RAM disk 40.

Once computed cluster is resident in RAM disk 40, the computed sector in which the data is to be written is marked 60 as active in the sector freelist. The data is then written 65 to RAM disk 40.

Figure 3:
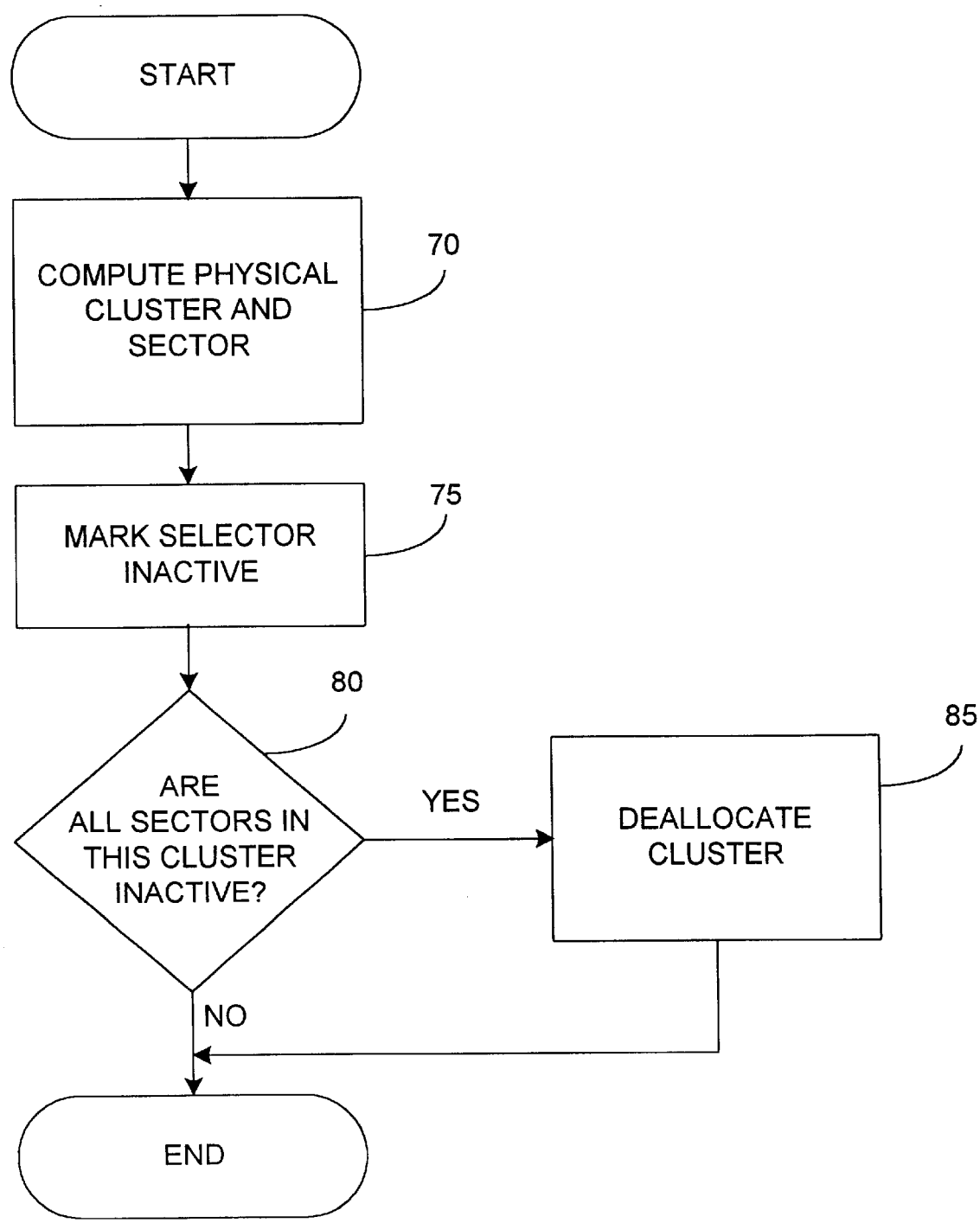
FIG. 3 is a flow chart showing a preferred embodiment of the present invention for dynamically releasing memory from a RAM disk.

FIG. 3 shows the operation of device driver 35 when data is discarded. For each logical cluster to be discarded, a physical cluster and sector are computed 70. The computed sector is then marked 75 inactive on the sector freelist. A check is then made to determine 80 whether all of the sectors in the freelist for the computed cluster are inactive. If all of the sectors are inactive, the computed cluster is deallocated 85 from RAM disk 40. Device driver 35 reports the address of the deallocated cluster to memory manager 25. The deallocated cluster then becomes available for other system uses.

One application for dynamic RAM disk 40 is in printers. Many multiple original print (mopy) printers require a storage medium and filesystem in order to properly perform the electronic collation functions. Existing mopy printers (mopiers) require the installation of an expensive hard disk. Dynamic RAM disk 40 allows mopy technology in printers that do not have hard disks. Dynamic RAM disk 40 allows printer-resident forms, fonts, and macros to be managed the same way as in printers equipped with hard disks.

Dynamic RAM disk 40 allows print jobs to be retained and easily administered in a printer. Since Dynamic RAM disk 40 size depends only on the quantity of data stored, job retention incurs a very low cost in terms of system resources. Since dynamic RAM disk 40 is presented to the user as a familiar file storage medium, the management of retained jobs is much easier than it might be if using some other memory-based approach.

In summary, what has been described above are the preferred embodiments for a system and method for dynamically allocating memory to a RAM disk. While the present invention has been described by reference to specific embodiments, it will be obvious that other alternative embodiments and methods of implementation or modification may be employed without departing from the true spirit and scope of the invention.

What is claimed is:

1. A device driver for dynamically allocating memory to a RAM disk, the device driver comprising:
   (a) means for determining an amount of memory required by the RAM disk;
   (b) means for allocating the required amount of memory to the RAM disk;
   (c) means for determining whether allocated memory is in use by the RAM disk for storage of data; and,
   (d) means for releasing, from the RAM disk, memory not in use by the RAM disk for storage of data.

2. The device driver of claim 1 wherein the means for allocating the required amount of memory includes:
   (a) a memory manager; and,
   (b) means for requesting from the memory manager the required amount of memory.

3. The device driver of claim 1 wherein the means for releasing memory includes:
   (a) a memory manager; and,
   (b) means for informing the memory manager of addresses of memory to be released.

4. A method for dynamically allocating memory to a RAM disk, the method comprising:
   (a) determining an amount of memory required by the RAM disk;
   (b) allocating the required amount of memory to the RAM disk;
   (c) determining whether allocated memory is in use by the RAM disk for storage of data; and,
   (d) releasing, from the RAM disk, memory not in use by the RAM disk for storage of data.

5. The method of claim 4 wherein allocating the required amount of memory includes requesting from a memory manager the required amount of memory.

6. The method of claim 4 wherein releasing memory includes informing a memory manager of addresses of memory to be released.

7. A system for dynamically allocating memory to a RAM disk, the system comprising:
   (a) a memory manager;
   (b) means for determining an amount of memory required by the RAM disk;
   (c) means for requesting the required amount of memory from the memory manager;
   (d) means for determining whether allocated memory is in use by the RAM disk for storage of data; and,
   (e) means for releasing unused memory to the memory manager.

8. The system of claim 7 wherein the means for means for releasing unused memory includes:
   (a) a memory manager; and,
   (b) means for informing the memory manager of addresses of memory to be released.

* * * * *